United States Patent [19]

Ishiguro et al.

[11] Patent Number: 4,831,316
[45] Date of Patent: May 16, 1989

[54] CONTROL SYSTEM FOR AN INDUSTRIAL ROBOT WITH A FORESIGHT FUNCTION

[75] Inventors: Yasuo Ishiguro, Toyota; Yoshito Kato, Aichi; Fumiaki Takeda, Hyogo; Mitsuo Koide, Owariasahi; Toshitaka Kuno; Masaru Nakano, both of Nagoya, all of Japan

[73] Assignee: Toyota Jidosha Kabushiki Kaisha, Japan

[21] Appl. No.: 103,403

[22] Filed: Oct. 1, 1987

[30] Foreign Application Priority Data

Oct. 2, 1986 [JP] Japan ............................... 61-234772

[51] Int. Cl.⁴ ............................................ G05B 19/42
[52] U.S. Cl. ................................ 318/568.13; 318/573; 364/513; 901/46; 901/47
[58] Field of Search ................ 318/568, 573; 364/513; 901/46, 47; 219/124.34

[56] References Cited

U.S. PATENT DOCUMENTS 4,642,752 2/1987 Debarbieri et al. ................. 364/167
4,675,502 6/1987 Haefner et al. ................. 219/124.34

Primary Examiner—William M. Shoop, Jr.
Assistant Examiner—Saul M. Bergmann
Attorney, Agent, or Firm—Finnegan, Henderson, Farabow, Garrett & Dunner

[57] ABSTRACT

A control system for an industrial robot having a hand which traces a pre-stored standard course defining its position and posture and which has a foresight function. The hand is provided with a tool and a work shape sensor, where the tool and the work shape sensor have a known spatial relationship. The foresight function is realized by a control system comprising temporary storing means for temporarily storing a future position and/or posture data of the tool calculated from a sensed position and/or posture data of the present sensor position. The stored data is output after a delayed time interval when it is compared with a pre-stored standard data. When the difference is small, the data is used to control the future position and/or posture of the hand. When the difference is great, an abnormality process is started.

12 Claims, 13 Drawing Sheets

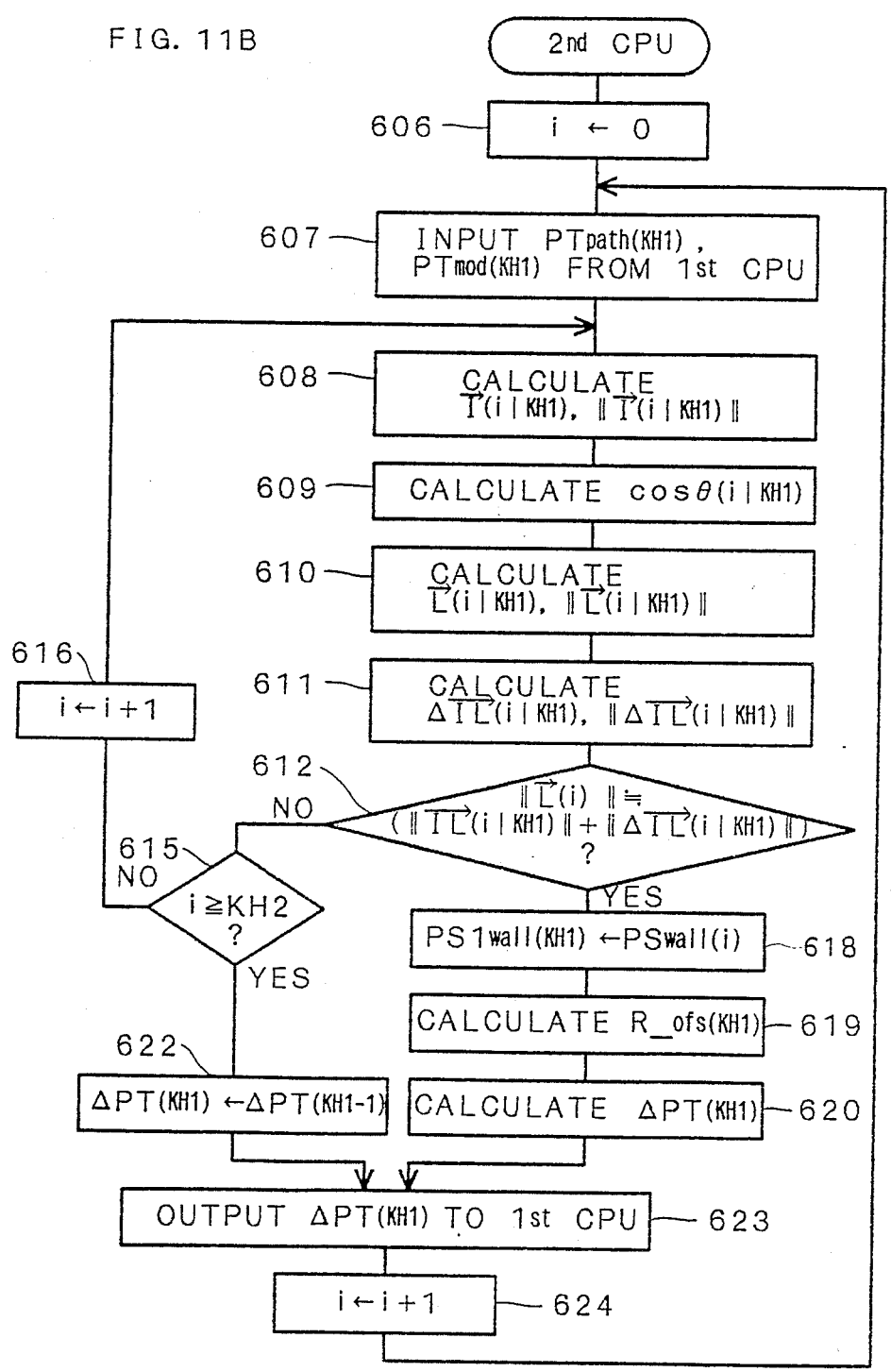

CONTROL SYSTEM FOR AN INDUSTRIAL ROBOT WITH A FORESIGHT FUNCTION

BACKGROUND OF THE INVENTION

1. Field of the Invention

The present invention relates to an industrial robot having a foresight function into a work point yet to be worked with a workpiece shape sensor.

2. Prior Art

There are many types of industrial robots. Some of them have a sensor for tracing certain reference points or lines of a workpiece, e.g. a profile line prescribed on a workpiece surface. An arc welding robot of such a type detects the lines to be welded by monitoring electric current in the welding rod, and by controlling the position of the welding rod holder. Another type of robot stores a welded line data beforehand by an operator's teaching operation of guiding a tool tip along the welded line, and the tool tip then moves and machines on the workpiece in accordance with the stored data.

The former type of welding robot can trace the joint line at low working speed, but it cannot follow it at high speed, because it requires computational time to accurately recognize the position to be welded. When the position is accurately recognized, the welding rod is already out of position. The latter type of robot with the teaching data memory can trace the taught line at high speed in an actual job stage, but it requires the tracing action twice: one for teaching and the other for the actual job. The result is an overall work inefficiency.

As an advanced technology, laid open document of Japanese Unexamined Patent Application No. sho 59-223817 discloses a robot for controlling a tool to trace a joint line of work members by using a slitted light projector and a two-dimensional camera. As sensing and working are simultaneously executed by the robot, the operational time could be reduced. But still it has some drawbacks as follows.

(1) As the data processing of the sensed two dimensional image data requires a lot of time, usually more than several seconds for one frame of image, this robot is made to go directly on a straight line from the present working point to the next remote working point. Only a starting point and an ending point of the workpiece is previously taught to this robot but information on the points between them is not taught. The robot is controlled exclusively on information acquired from the sensor between those points. Therefore, when there is an unexpected steep irregular part between those points on the work surface, high tracing fidelity is impossible.

(2) When the sensor fails in the course of the work, the robot follows the erred data of the sensor, resulting in possible collision with the workpiece.

SUMMARY OF THE INVENTION

It is an object of the present invention to provide a control system for an industrial robot with a foresight function into the work and a teaching data storing function which co-operatively provides the robot with a responsiveness to a higher working speed even on a complicated workpiece shape.

Another object of the invention is to provide an efficient control system applicable to various industrial robots from simple operating capability to complicated operating capability.

These and other object are achieved by the present invention having a construction set forth.

The system is applicable to an industrial robot R4, as shown schematically in FIG. 1, having a hand R1 which is provided with a tool R2 and a workpiece shape sensor R3. The tool R2 and the workpiece shape sensor R3 have a known spatial relationship relative to one another. The system which traces a pre-stored standard course, comprises: temporary store means R5 for inputting shape data of a workpiece W sensed by the workpiece shape sensor R3 at a present sensing point, calculating and storing a subsequent position and/or posture data of the tool R2, the subsequent position and/or posture data corresponding to a time point at which the tool R2 comes to said present sensing point, and outputting the subsequent position and/or posture data after a delayed time interval. The delayed time interval corresponds to a time interval through which the tool R2 comes to the present sensing point; comparing means R6 for calculating a difference between the subsequent position and/or posture data and a pretaught standard position and/or posture or attitude data of the tool R2 calculated from the pre-stored standard course; and control means R7 for controlling the position and/or posture of the hand R1 based on the calculated difference.

The robot R4 may be a simple 2-degree-of-freedom type. One degree of freedom is for controlling the distance between the hand R1 and the workpiece W; the other degree of freedom is for the movement perpendicular to the distance. In this case, the posture of the tool R2 is fixed. The advantage of the invention is that the controller can control more complicated multi-axis or multi-joint robots having, for example, five or six axes of rotation. In this case, the posture of the tool R2 can be controlled in addition to the position. The kind of work done by the robot is naturally unimportant to the invention. Welding, painting, cutting, trimming, drilling, assembling, measuring the dimensions and inspection of surface defects are some examples of the work. The tool R2 is not limited to conventional metal tools or modern laser tools for machining, and measuring devices or some other inspecting devices can be the tool R2 in this invention.

The workpiece shape sensor R3 may be a simple distance sensor which detects only the distance between the sensor and the workpiece. This type of sensor can be used in the 2-axis robot. In more sophisticated robots, the sensor R3 senses a workpiece shape, i.e. a direction of the normal vector of the work surface, besides the distance. The sensor R3 may be any type such as non-contact type, e.g. laser distance sensor, or contact type sensor, e.g. a wire probe sensor.

The temporary storage means R5 temporarily stores information sent from the sensor R3, and outputs it sequentially or selectively to the comparing means R6. Specifically, the temporary storage means R5 may be composed of, memory chips, and integrated circuits capable of executing a predetermined logical functions. The temporary storage means R5 has another function to reconcile the sensing timing of the sensor R3 and the control timing of the robot R4.

The standard path or course of the hand R1 is, in one case, a course constructed by interpolating discrete teaching points stored in a memory of the robot control system. It may be, in another case, a path or course determined by a preset program.

According to one aspect of the invention, the temporary storage means R5 of the control system may comprise:

means for calculating said subsequent position and/or posture data from a present relative position and/or posture data of the workpiece W with respect to the workpiece shape sensor R3, which is detected by the workpiece shape sensor R3 and a present position and/or posture or attitude data of the hand R1;

means for storing the subsequent position and/or posture data;

means for determining whether a current position and/or posture data is substantially the same as the stored subsequent position and/or posture data at the end of the delayed time interval; and means for correcting the standard course using the current position and/or posture data that is determined to be substantially the same in the determining means.

The control means R7 may comprise abnormality processing means for executing a predetermined abnormality processings when said difference calculated in the comparing means R6 is greater than a pre-determined threshold value. The predetermined abnormality processings can include stopping movement of the robot R4 and outputting an abnormality signal externally of the robot R4. The predetermined abnormality processings may otherwise include stopping, utilizing the calculated difference which is based on the sensed shape data; and controlling the position and/or posture of the hand R1 based only on the standard position and/or posture data of the tool R2 calculated from the standard course.

Various functional means described above can be constructed by a logic circuit of discrete electronic elements or by a microcomputer including some integrated circuits with predetermined processing programs.

BRIEF EXPLANATION OF THE DRAWINGS

The invention may be best understood by referring to the following description of a preferred embodiment and the drawings in which:

FIG. 11A and FIG. 11B are flow charts of programs executed in parallel in the second CPU 301.

DESCRIPTION OF PREFERRED EMBODIMENT

Figure 1:
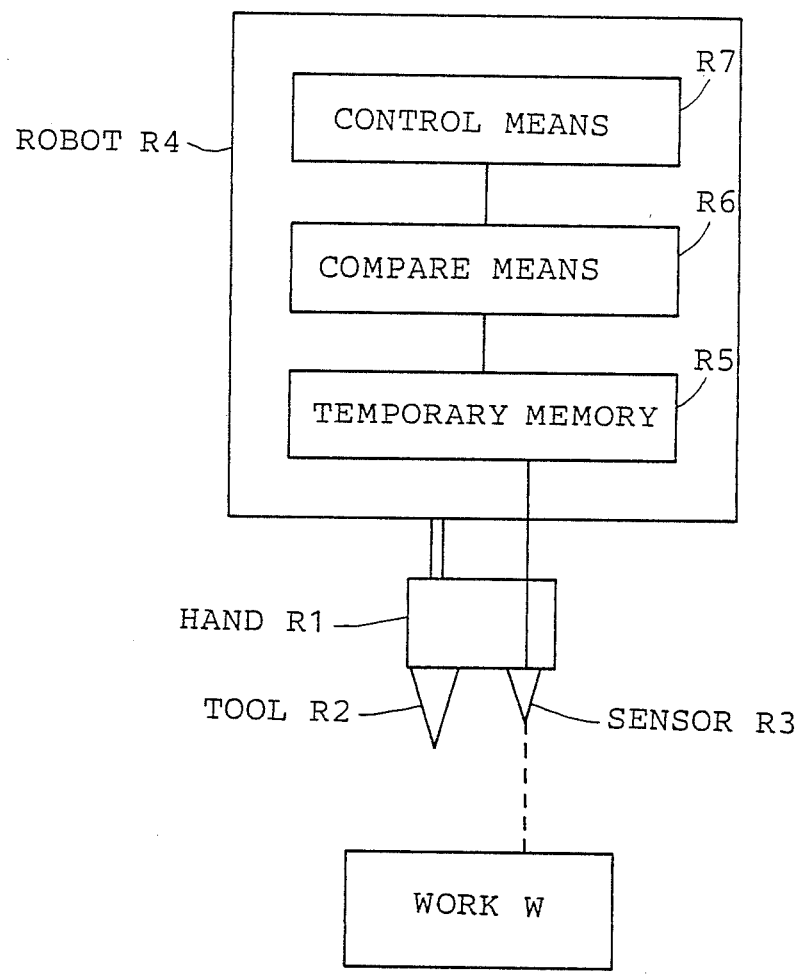
FIG. 1 is a schematic block diagram showing the basic structure of the invention.

This embodiment is a six-axis robot equipped with a tool for machining a workpiece by means of a laser beam and equipped with a sensor for sensing the shape of a workpiece at a position yet to be worked. As shown in the perspective view of a robot system of FIG. 2, a robot 10 includes: a robot controller 12 for general control of the robot 10; a teaching box 14 for permitting an operator to teach the robot 10 in advance how to proceed with the job; an actuator 16 having six axes of rotation and being controlled by the robot controller 12; a hand 18 with a laser tool 20 and a sensor head 22 for sensing the shape of a workpiece W; and a sensor controller 24 for processing information from the sensor head 22. The robot controller 12 is provided with a terminal T and a printer P. Details of the actuator 16 and the hand 18 are described hereinafter.

The tool 20 uses a big power laser light beam which is generated by an external device (not shown). The laser beam is directed to the tip of the tool 20 via a light guide 26 and is spotted on the surface of the workpiece W. Other components of the laser tool 20, such as mirrors and prisms, are not shown in the figure because they are not important to the present invention.

Figure 4:
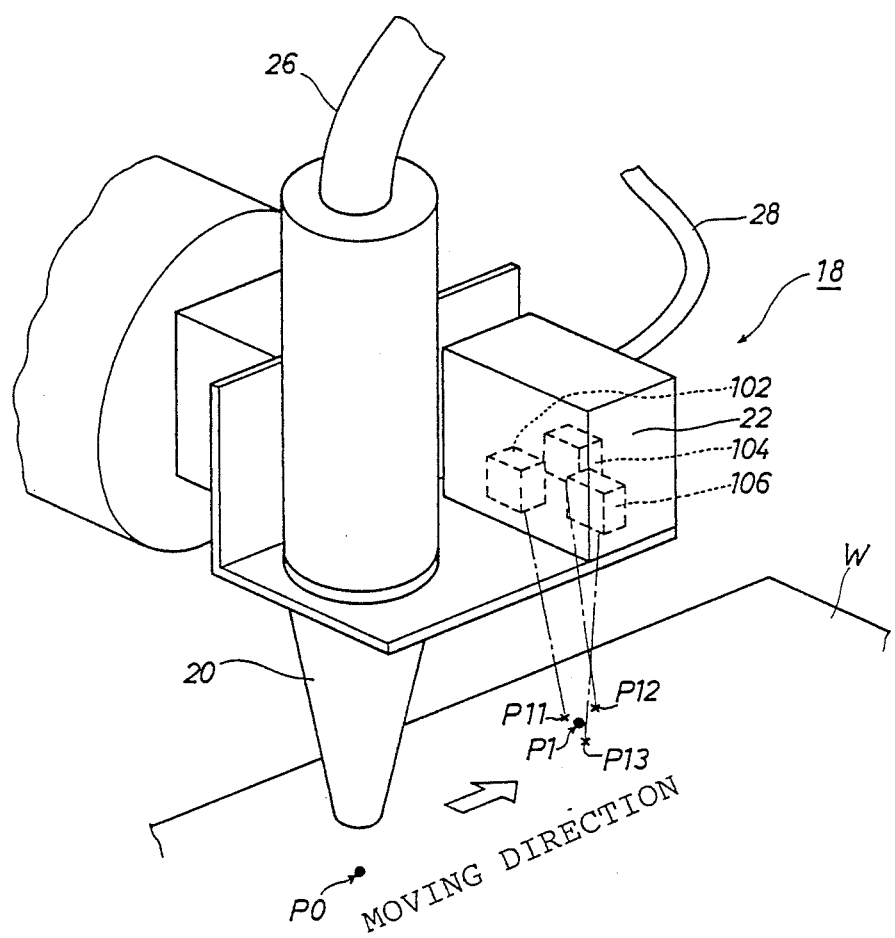
FIG. 4 is an enlarged fragmentary perspective view of a portion of the robot of FIG. 2 showing the hand part having the laser tool and a shape sensor of the robot in working position.

The sensor head 22 senses the relative position of the workpiece W with respect to the sensor head 22 and also senses the posture of the workpiece W by means of a combination of three distance sensors (see FIG. 4). The outputs of the sensor head 22 are transmitted to the sensor controller 24 via a sensor cable 28 and are processed in the controller 24, both of which are detailed hereinafter.

Figure 3A:
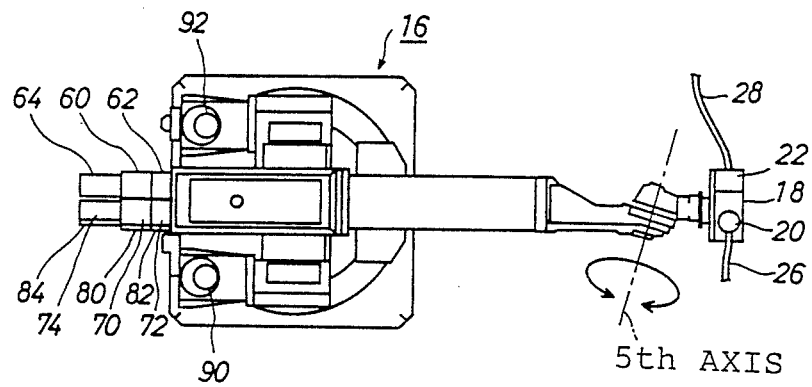
FIG. 3A is a plan view of the actuator portion of the robot of FIG. 2.
Figure 3B:
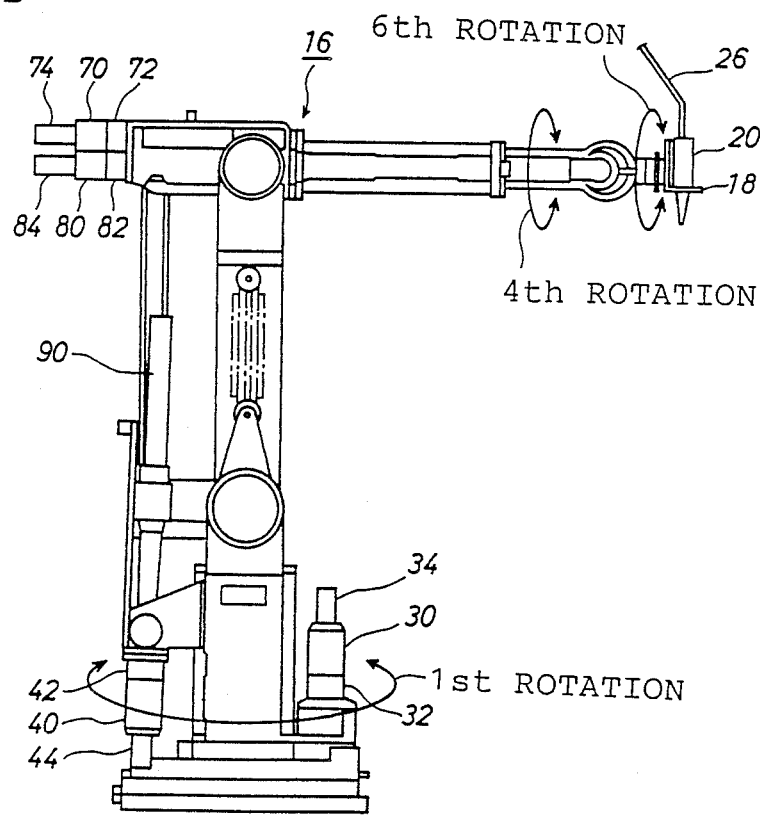
FIG. 3B is a side view of the actuator portion of the robot of FIG. 2
Figure 3C:
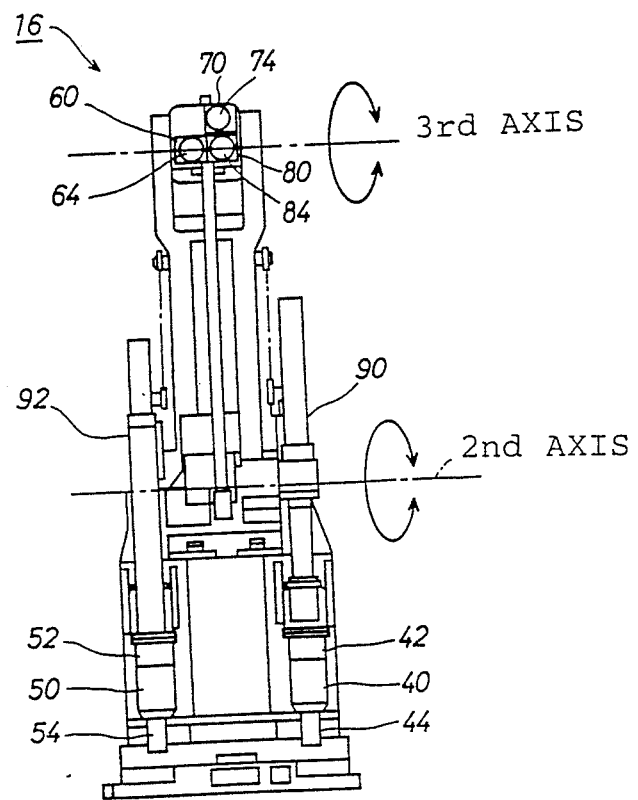
FIG. 3C is a front view of the actuator portion of the robot of FIG. 2.

The actuator 16 of the robot 10 is now explained in detail in connection with the description of FIGS. 3A, 3B and 3C. This actuator 16 has six axes of rotation: the first, second and third axes control a position of the hand 18 in relation to the workpiece W; and the fourth, fifth and sixth axes control a posture of the hand 18 in relation to the workpiece W. Each axis has a motor, a brake and a rotation angle sensor (of an encoder type): the first axis has a first motor 30, a first brake 32 and a first angle sensor 34; the second axis has a second motor 40, a second brake 42 and a second angle sensor 44; the third axis has a third motor 50, a third brake 52 and a third angle sensor 54; the fourth axis has a fourth motor 60, a fourth brake 62 and a fourth angle sensor 64; the fifth axis has a fifth motor 70, a fifth brake 72 and a fifth angle sensor 74; and the sixth axis has a sixth motor 80, a sixth brake 82 and a sixth angle sensor 84. Rotation about the second axis and the third axis are performed by the following mechanism. Rotation of the motors 40 and 50 are transformed into linear movements of respective ball screw feeders 90 and 92; and the linear movements are transformed into rotations on the axes by means of parallel links. Rotation about the other axes are driven by respective motors via torque tubes, reduction gears and other transmitting members.

The hand 18 of the actuator 16 is explained with reference to FIG. 4. The laser tool 20 and the sensor head 22 are attached to the hand 18 with a preset distance between them. The relative positional relationship between the tool 20 and the sensor head 22 is unchanged regardless of the movement of the hand 18. As described before, the sensor head 22 includes three distance sensors 102, 104 and 106. The robot 10 moves over the workpiece W in such a manner that the sensor head 22 precedes the tool 20. In other words, the sensor head 22 senses a point P1 of a work surface at which the tool 20 will machine subsequent to a point P0 on which the tool 20 is in machining position.

The sensor head 22 senses the point P1 as follows. The three distance sensors 102, 104 and 106 measure the distance and the direction of points P11, P12 and P13 from respective sensors 102, 104 and 106. The points P11, P12 and P13 are actually very close to the point P1 but are shown more distant in FIG. 4 for the purpose of explanation.

Figure 5:
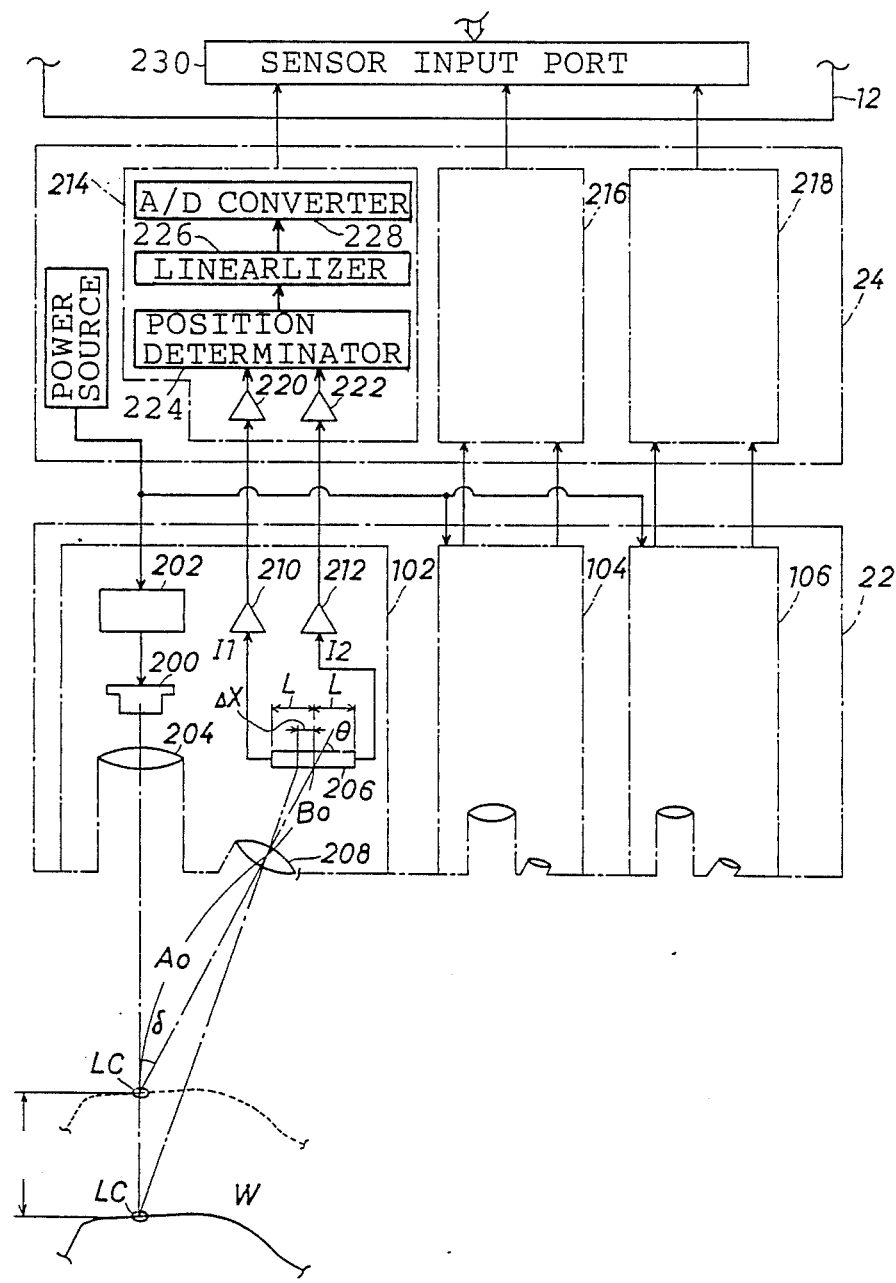
FIG. 5 is an illustrative figure of a workpiece, a sensor head and a sensor controller of the robot during sensing.

FIG. 5 shows a block diagram of the sensor head 22 and the sensor controller 24. Each distance sensor 102, 104 and 106 detects the distance to a surface point LC of the workpiece W by the following method. For purpose of brevity, this method is described only for the sensor 102. The distance sensor 102 includes: a laser diode 200 for emitting a laser light having wavelength of about 750 µm; a pulse modulator 202 for pulsating the laser light with a preset duty ratio; a collimator lens 204 for collimating the laser light; a one-dimensional PSD (Position Sensitive Device) 206 of length 2·L; an objective lens 208 for focusing the laser light reflected by the work surface on the PSD 206; and two pre-amplifiers 210 and 212 for converting the photo induced electric currents I1 and I2 from the PSD 206 into corresponding voltages. The PSD 206 is made of silicon photo diodes: a p-type resistant layer is provided on a high resistance silicon substrate (i-layer); two electrodes are provided on either ends of the layered structure for outputting signals; and a common electrode is provided at the center of the surface of the high resistance silicon substrate (i-layer). When a light is focused on a certain position of the p-type layer surface, electric current Io is generated there. The current Io is divided into two currents I1 and I2 which are outputted from the electrodes of the either ends of the PSD 206. When the focused position is dislocated by a distance of Δx from the center of the PSD 206, the respective currents I1 and I2 outputted from the PSD 206 to the pre-amplifiers 210, 212 are given by:

$$I1 = Io \cdot (L + \Delta x)/(2 \cdot L) \text{ and}$$

$$I2 = Io \cdot (L - \Delta x)/(2 \cdot L) \qquad (1).$$

Namely, the current Io is divided into currents I1 and I2 in reverse proportion to the distance of the focused position to the respective end electrodes.

The optical system including the laser diode 200, the collimator lens 204, the objective lens 208 and the PSD 206 is so arranged that:

(1) when the axis of the incident laser light and the axis of the reflected light make an angle $\theta$, the reflected laser light passes the center of the PSD 206, and (2) in that case an angle $\theta$ made by the reflection axis and the PSD 206 is set at such a value that the laser light reflected from the spotted point LC on the work surface focuses on the PSD surface irrespective of the position of the point LC.

Therefore, a displacement x of the workpiece W, i.e. a change in the distance between the distance sensor 202 and the workpiece W, and the dislocation Δx of the focus point from the center of the PSD 206 have a relation as follows.

$$\Delta x = (1/\cos\theta) \cdot (Bo - (Ao \cdot f + f \cdot x \cdot \cos\delta)/(Ao - f + x \cdot \cos\delta)) \qquad (2),$$

where f is a focal length of the objective lens 208,

Ao is a distance between the spotted point LC to the objective lens 208 when the incident axis and the reflected axis make angle $\delta$, and Bo is a distance between the objective lens 208 to the center point of the PSD 206.

From the equations (1) and a general equation $(1/f = 1/Ao + 1/Bo)$ representing a relationship between focal lengths, the following equation is derived:

$$\begin{aligned}\Delta x/L &= (I1 - I2)/(I1 + I2) \\ &= K \cdot x/(1 + \alpha \cdot x)\end{aligned} \qquad (3)$$

where
$K = ((\cos\delta) \cdot (Bo - f))/(L \cdot (\cos\theta) \cdot (Ao - f))$ and $\alpha = (\cos\delta)/(Ao - f)$.

Equation (3) shows that the displacement x of the workpiece W with respect to the distance sensor 102 is known by measuring the output currents I1 and I2 from the opposite ends of the PSD 206. The calculations of the equation (3) are performed at the calculation sections 214, 216 and 218 of the sensor controller 24 in this embodiment. As the three calculation sections 214, 216 and 218 have the same construction, only section 214 will be described.

A position determinator 224 of the calculation section 214 receives the output currents I1 and I2 from the PSD 206 via respective input buffers 220 and 222 and calculates (I1−I2)/(I1 +I2). The position determinator 224 outputs a signal representing the calculation result and proportional to Δx/L to a linearizer 226, wherein the signal is corrected to be proportional to the displacement x of the workpiece W. The output signal of the linearizer 226 is converted into a digital signal by an A/D converter 228 to be input into a sensor input port 230 of the robot controller 12.

Figure 6:
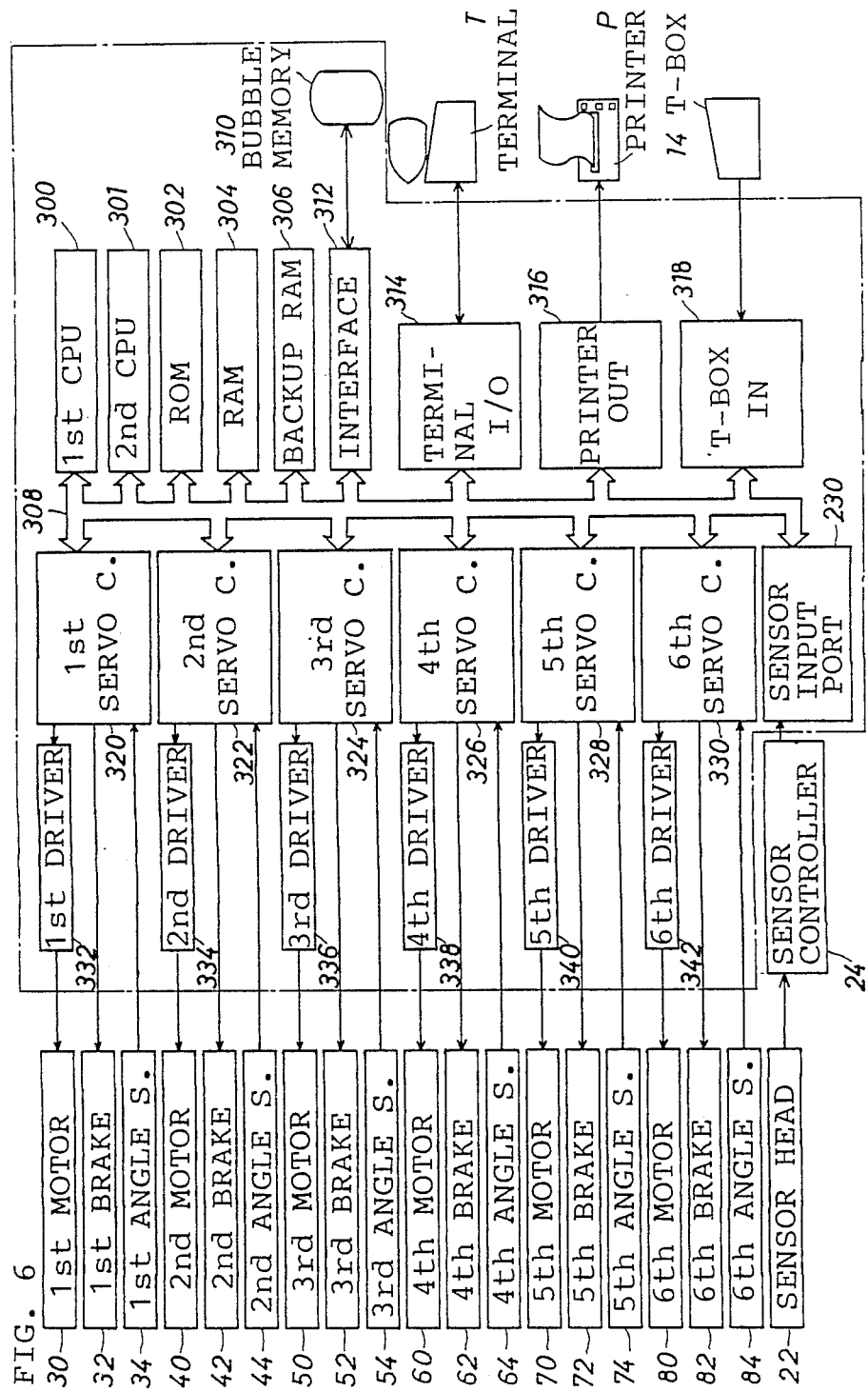
FIG. 6 is a schematic block diagram of the actuators and controller of the robot of FIG. 2.

The robot controller 12 is now explained with reference to FIG. 6. The robot controller 12, working as a process controller for the six-axis actuator 16 and as a teaching controller for the robot 10, is a microcomputer including a first CPU 300, a second CPU 301, ROM 302, RAM 304, backup RAM 306 and other electronic elements interconnected via a bus line 308, all of which are well-known and easily available devices. The other elements include: a bubble memory 310 as an external memory device; a bubble memory interface 312 for the bubble memory 310; a terminal I/O port 314 for a terminal T equipped with a CRT display and a keyboard; a printer output port 316 for a printer P; a T-box input port 318 for a teaching box (T-box) 14; the sensor input port 230 for the sensor head 22, here the sensor input port 230 generates an interrupt in the second CPU 301 at every preset time interval to transmit the signal from the sensor controller 24; and six servo circuits 320, 322, 324, 326, 328 and 330 for respective first to sixth axes.

Every one of the servo circuits 320 through 330 is a so-called intelligent type, provided with a CPU. When a target position data and a target posture data for the tool 20 are given from the first CPU 300 via the bus line 308, the circuits 320, 322, 324, 326, 328 and 330 drive respective motors 30, 40, 50, 60, 70 and 80 via motor drivers 332, 334, 336, 338, 340 and 342 to locate the tip of the tool 20 at the target position and to place the tool 20, or the hand 18, in a target posture. In the driving process, the angle sensors 34, 44, 54, 64, 74 and 84 feed back the rotation angle on respective axes to the servo circuits 320 through 330. The circuits 320 through 330 further drive the brakes 32, 42, 52, 62, 72 and 82 as occasion demands in order to prevent the arm of the actuator 16 from falling down when the power source for the servo circuits 320 through 330, or for the motors 30, 40, 50, 60, 70 and 80, is turned off.

Figure 2:
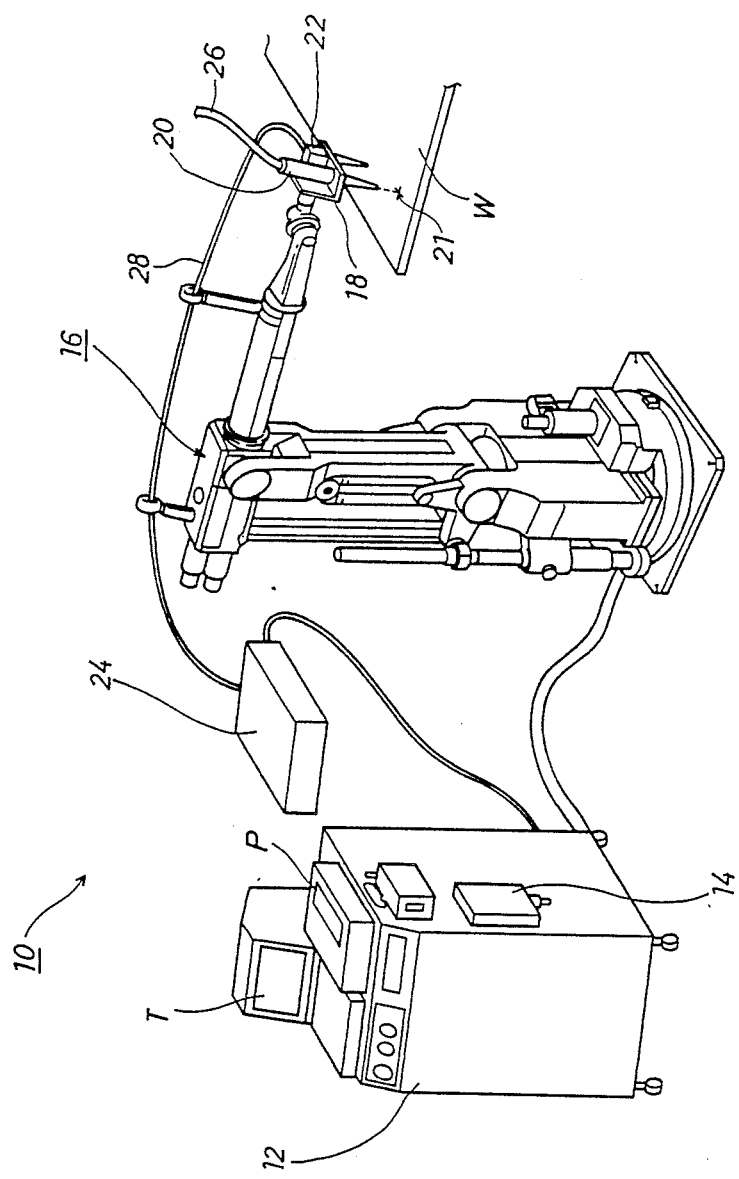
FIG. 2 is a perspective view of a robot system with a laser tool in a preferred embodiment of the invention.
Figure 7:
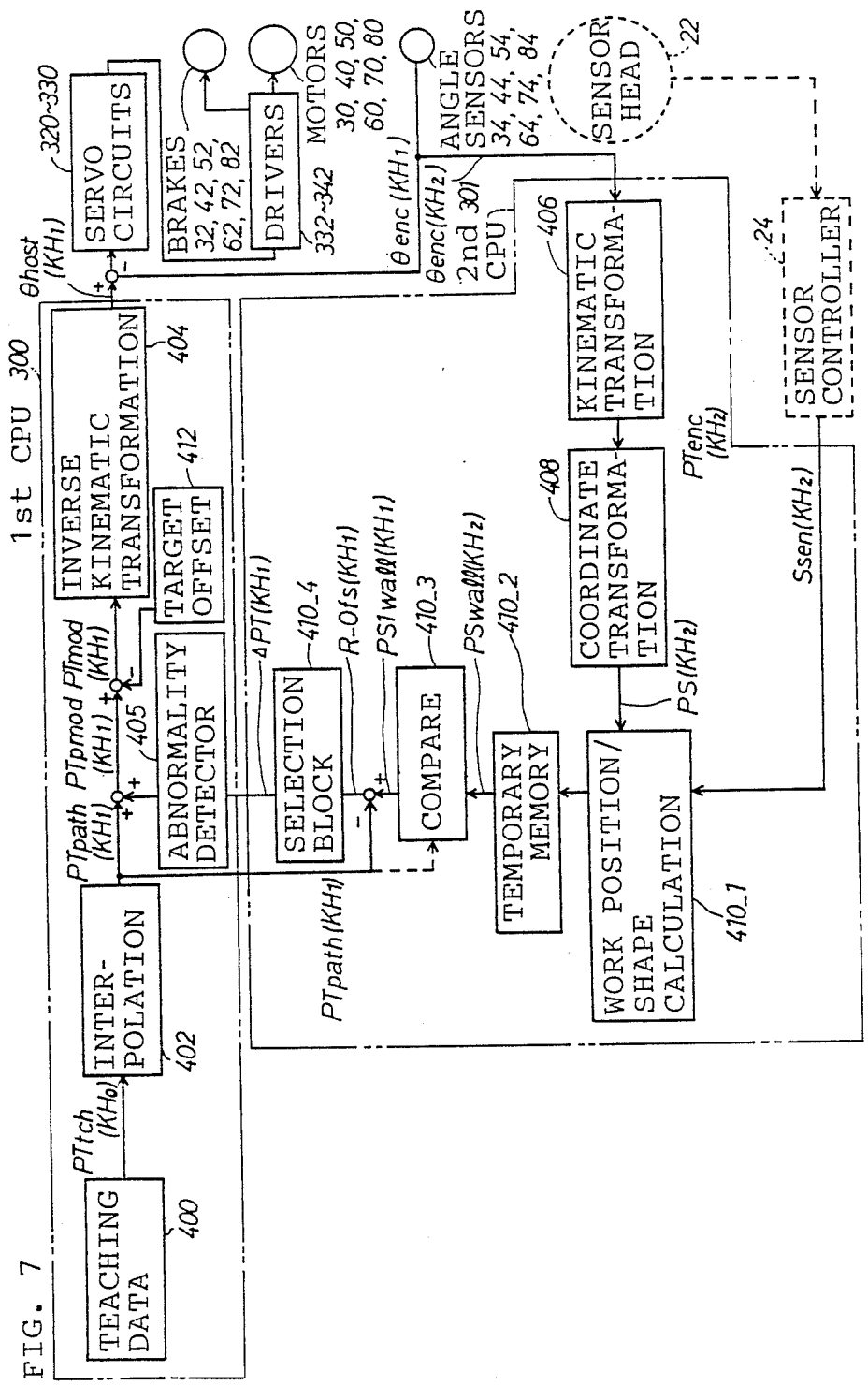
FIG. 7 is a functional block diagram of a first CPU and a second CPU used in the robot of FIG. 2.

Operations of the robot controller 10 is here explained with reference to the perspective view of the system in FIG. 2 and the functional block diagram in FIG. 7. The control of the robot controller 12 is broadly defined in two parts. One is a part controlled by the first CPU 300 for generating a command signal calculated from pre-taught data and corrected by a correction $\Delta PT(KH1)$ and for outputting it to the actuator 16; the other is a part controlled by the second CPU 301 for calculating the correction $\Delta PT(KH1)$ based on the shape data sensed by the sensor head 22.

The command generating part is first explained. Before starting a particular job with the robot 10, an operator teaches the robot 10 which work points 21 (see FIG. 2) on the workpiece W the tool 20 should trace and what posture the tool 20 should take in advance of every work point 21 via the teaching box 14. The input data 400 (FIG. 7) of the teaching information is stored in the backup RAM 306 (FIG. 6).

An example of an easy teaching operation is as follows. An offset bar of a certain length is attached at the tip of the laser tool 20. The length of the offset bar is determined as an appropriate distance between the tip of the tool 20 and the work surface adapted for the specific job. The operator moves the hand 18 with the tip of the offset bar tracing a desired path on the workpiece surface, or sometimes off the surface, determining the position and posture of the tool 20 at every work point 21 (FIG. 2).

The position of every work point 21 with respect to a predetermined reference point of the robot 10 and the posture of the tool 20 at the work point 21 are stored in the form of a 4×4 matrix. For example, teaching data at an m-th teaching point (work point) is represented by $$PTtch(m) = \begin{bmatrix} Nx & Ox & Ax & X \\ Ny & Oy & Ay & Y \\ Nz & Oz & Az & Z \\ 0 & 0 & 0 & 1 \end{bmatrix}, \quad (4)$$

where
Nx, Ny, Nz are xyz components of a normal vector,
Ox, Oy, Oz are xyz components of an orient vector,
Ax, Ay, Az are xyz components of an approach vector and
X, Y, Z are xyz components of a position vector of the m-th teaching point.

Every component of the vectors is represented by a coordinate system 0-XYZ with the origin 0 at the predetermined reference point of the robot 10. The normal vector represents a normal direction of the workpiece surface; the orient vector represents a moving direction of the tool 20 and is perpendicular to the normal vector; and the approach vector is perpendicular to the two vectors.

After the teaching operation, the robot 10 starts the particular job. The basic operations of the robot 10 are similar to those of a known playback robot; and are explained with reference to FIG. 7. While the teaching operation is done at a series of teaching points PTtch(KH0) and the data 400 is stored in the memory, the points PTtch(KH0) are fewer for an actual machining job. Therefore, position and posture data PTpath(KH1) (target data) of the tool 20 is calculated from the nearest several teaching point data PTtch(KH0) (400) stored in the memory by a known interpolating method (402). A correction $\Delta PT(KH1)$ and a target offset Ofs(KH1) 412 are then applied on the target data PTpath(KH1) to turn out a modified data PTmod(KH1).

$$PTpmod(KH1) = PTpath(KH1) \, \Delta PT(KH1) \quad (5)$$

Here, PTpmod(KH1) is a primary target position of the tool tip.

$$PTmod(KH1) = PTpmod(KH1) \cdot (Ofs(KH1)) \quad (6)$$

Figure 8:
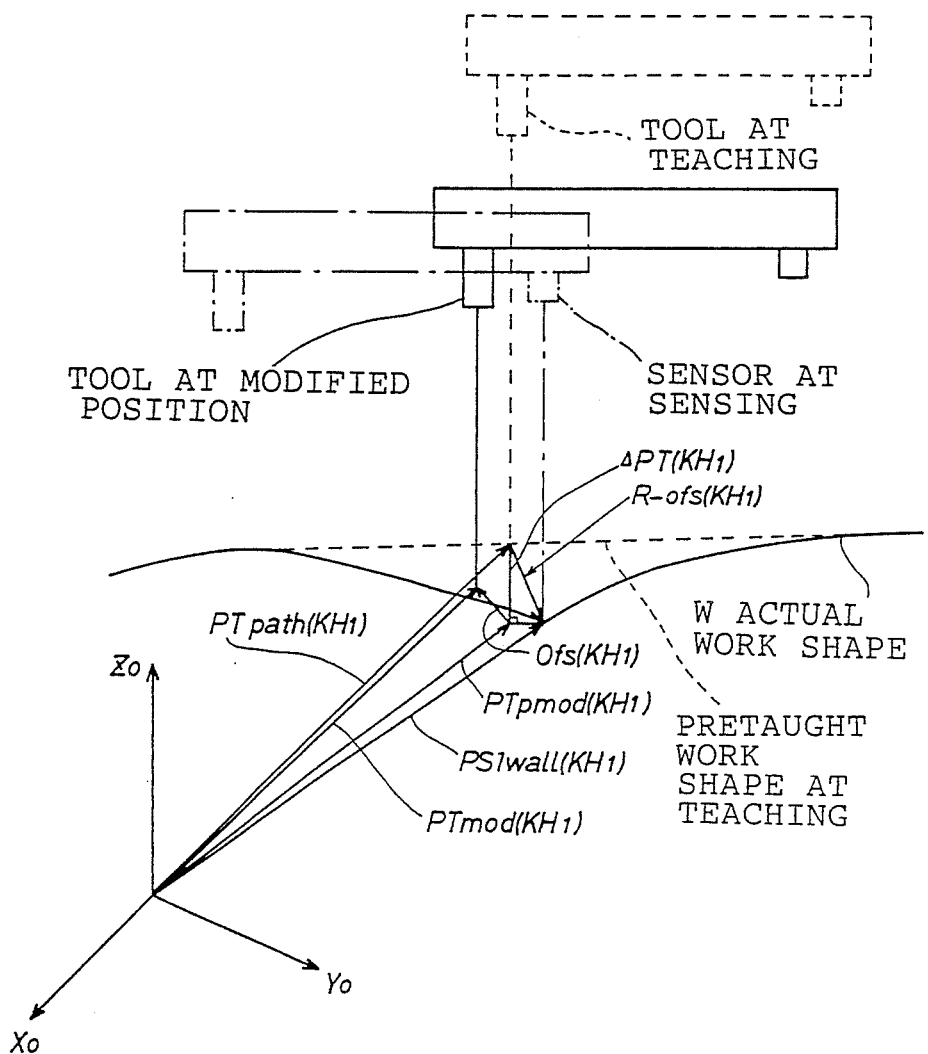
FIG. 8 is a schematic representation of the robot tool and the workpiece illustrating a situation where actual workpiece shape is different from a pretaught shape.

The target offset Ofs(KH1) is a position of the work point 21 represented by a coordinate system originating on the tip of the tool 20 and represents a relative position of the work point 21 with respect to the tool tip. The correction $\Delta PT(KH1)$ is calculated in the second CPU 301, which is explained later. In the above case, PTpath(KH1), $\Delta PT(KH1)$, PTpmod(KH1), Ofs(KH1) and PTmod(KH1) have a relationship as shown in FIG. 8. The modified data PTmod(KH1) is input into an inverse kinematic transformation block 404 (FIG. 7), which decodes PTmod(KH1) and generates rotation angle data $\theta$host(KH1) for the six axes. Those are operations executed in the first CPU 300.

Each of the six angle data $\theta$host(KH1) is output to respective servo circuits 320 through 330, which control the motors 30, 40, 50, 60, 70 and 80 via the drivers 332 through 342 to move the work point 21 of the tool 20 to the modified target point represented by PTmod(KH1).

When the correction $\Delta PT(KH1)$ calculated in the second CPU 301 is received by the first CPU 300, it is first compared with a predetermined threshold value $\beta$ at the abnormality detecting block 405. When the amount of the correction $\Delta PT(KH1)$, which is represented by $l_2$ norm $|\Delta PT(KH1)|$ of the Euclidian space, is greater than $\beta$, it is possible that the robot 10 may be astray. In that case, preset abnormality processings, e.g. an emergency stop of the robot 10, are started. If the amount of correction $|\Delta PT(KH1)|$ is less than $\beta$, the correction $\Delta PT(KH1)$ is used normally as described above to turn out the modified target data PTmod(KH1) in the first CPU 300.

Figure 9:
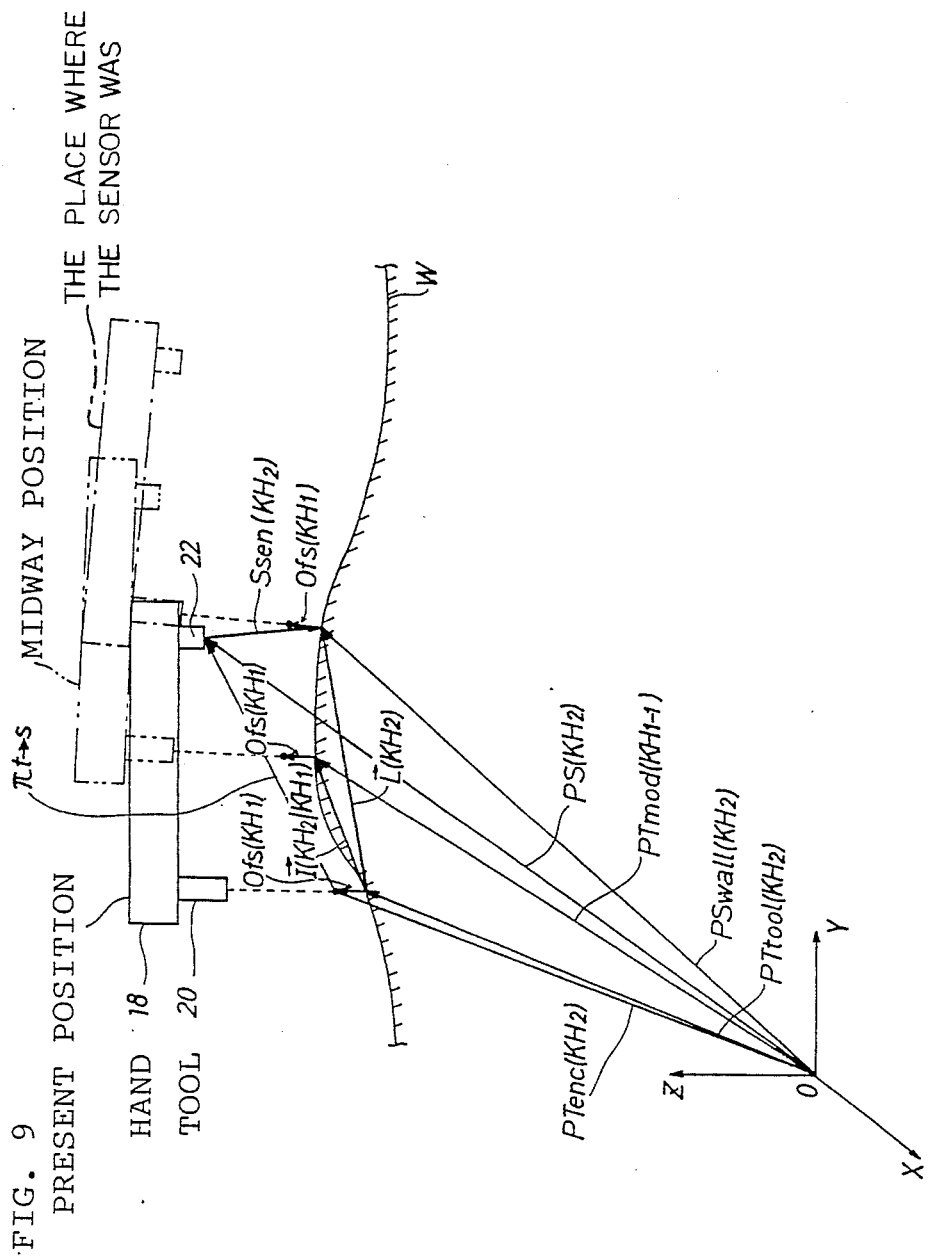
FIG. 9 is a schematic representation of the robot tool and the workpiece illustrating relations of various vectors during movement.

The calculating process of the correction $\Delta PT(KH1)$ in the second CPU 301 is then explained with reference to FIG. 7 and FIG. 9. The first CPU 300 and the second CPU 301 are working in parallel and the output timing of the modified target data PTmod(KH1) from the first CPU 300 and the output timing of the correction $\Delta PT(KH1)$ from the second CPU 301 are in synchronization. But the interval of sensing and storing the shape of the workpiece W executed in the second CPU 301 is smaller than or equal to the interval of the above output timing of PTmod(KH1) and $\Delta PT(KH1)$. Therefore, a time interval corresponding to a series of points KH2 for sensing, which will be explained, is shorter than or equal to that of the previously explained series of points KH1.

When a routine of the second CPU 301 is started, the CPU 301 first inputs rotation angle data $\theta$enc(KH2) of the six axes from the angle sensors 34, 44, 54, 64, 74 and 84 and then converts the data into actual position and posture data PTenc(KH2) of the tool 20 utilizing a kinematic transformation block 406. The conversion is done in accordance with the following calculation.

$$PTenc(KH2) = \Lambda[\theta enc(KH2)] \qquad (7),$$

where $\Lambda$ is an encoding matrix and [$\theta$enc(KH2)] is an angle vector composed of the input six angles. At a coordinate transformation block 408, the actual data PTenc(KH2) is transformed into an actual position data PS(KH2) of the sensor 22 by the following equation.

$$PS(KH2) = PTenc(KH2) \cdot \pi_{t-s} \qquad (8),$$

where $\pi_{t-s}$ is a position and posture matrix representing the position of the sensor 22 with respect to the work point 21.

A sensed data Ssen(KH2) representing the relative position of the sensor 22 and the workpiece W and the shape of the workpiece W at the sensing point input from the sensor controller 24 is converted into a workpiece shape data PSwall(KH2) (410$_1$31) representing the position and posture of the workpiece W with respect to the reference point 0 of the robot 10 utilizing the data PS(KH2).

$$PSwall(KH2) = PS(KH2) \cdot Ssen(KH2) \qquad (9).$$

The sensed data Ssen(KH2) may be an average of a plurality of sensed data with a very short sampling interval.

The data PSwall(KH2) is temporarily stored in a memory 410_2, where the RAM 304 actually works as the memory 410_2.

After a predetermined time interval, a compare block 410_3 calculates a specifically selected work shape data PS1wall(KH1) for a next work point utilizing the data PSwall(KH2) stored in the temporary memory 410_2 by the following processings.

First a position of the work point PTtool(KH2) is calculated from the actual position data PTenc(KH2) and the target offset Ofs(KH1) by the following equation.

$$PTtool(KH2) = PTenc(KH2) \cdot (Ofs(KH1))^{-1} \qquad (10).$$

Here the target offset Ofs(KH1) is changed according to information external of the robot 10, e.g. machining conditions, or according to commands generated in the control program of the robot 10.

From the xyz components (Xwall, Ywall, Zwall) of the workpiece shape data PSwall(KH2) and the xyz components (Xtool, Ytool, Ztool) of the position data PTtool(KH2) of the work point at KH2, a vector L(KH2) spanning from PTtool(KH2) to PSwall(KH2) is defined as $$L(KH2) = (Xwall, Ywall, Zwall) - (Xtool, Ytool, Ztool) \qquad (11)$$

Another vector I(KH2|KH1) spanning from PTtool(KH2) to PTmod(KH1−1) is defined from the xyz components (Xmod, Ymod, Zmod) of the present modified position data PTmod(KH1−1) and the xyz components (Xtool, Ytool, Ztool) of the position data PTtool(KH2) of the work point at KH2.

$$I(KH2|KH1) = (Xmod, Ymod, Zmod) - (Xtool, Ytool, Ztool) \qquad (12)$$

From these two vectors L(KH2) and I(KH2|KH1), a length $||L(KH2|KH1)||$ of a vector IL(KH2|KH1) which is a projection of I(KH2|KH1) on L(KH2) is calculated as $$|IL(KH2|KH1)| = ||I(KH2|KH1) \cdot \cos\theta(KH2|KH1)|| \qquad (13)$$

where $$\cos\theta(KH2|KH1) = (L(KH2) \cdot I(KH2|KH1))/(||L(KH2)|| \, ||I(KH2|KH1)||)$$

Then a change $\Delta IL$ of IL by one sample interval is calculated as $$\Delta IL(KH2|KH1) = IL(KH2|KH1) - IL(KH2|KH1-1) \qquad (14).$$

PS1wall(KH1) is determined as PSwall(KH2) at which $||L(KH2)|| - (||IL(KH2|KH1)|| + |\Delta IL(KH2|KH1)|)$ is nearest to 0. Alternatively, when a KH2 value at which $||L(KH2)|| - (||IL(KH2|KH1)|| + ||\Delta IL(KH2|KH1)||)$ is least does exist, PS1wall(KH1) may be determined by interpolating from three work shape data PSwall(KH2-1), PSwall(KH2) and PSwall(KH2+1). For example, only the position vectors are calculated out by the following interpolation.

$$\alpha 1 = (||PSwall(KH2-1) - PTpath(KH1)||)^{-1},$$

$$\alpha 2 = (||PSwall(KH2) - PTpath(KH1)||)^{-1}, \text{ and}$$

$$\alpha 3 = (||PSwall(KH2+1) - PTpath(KH1)||)^{-1},$$

where PSwall is a position vector of PSwall and PTpath is a position vector of PTpath. Providing $$\bar{a}1 = \alpha 1/(\alpha 1 + \alpha 2 + \alpha 3),$$

$$\bar{a}1 = \alpha 1/(\alpha 1 + \alpha 2 + \alpha 3) \text{ and}$$

$$\bar{a}1 = \alpha 1/(\alpha 1 + \alpha 2 + \alpha 3),$$

the position vector PSwall is calculated as $$PS1wall(KH1) = \bar{a}1 \cdot PS1wall(KH2-1) + \bar{a}2 \cdot PS1wall(KH2) + \bar{a}3 \cdot PS1wall(KH2+1).$$

The reason why PS1wall(KH1) is selected as described above is that the interval of the output of target data from the robot controller 12 to the servo circuits 332 through 342 is longer than the interval of the input of the position and shape data of the work point from the sensor controller 24. Another reason is that the working speed of the robot 10 may occasionally change from a lower speed to a higher speed. In any case, there stored a plurality of work shape data in the temporary memory 410$_1$32 and it is necessary to select a most suitable data among the plurality of data.

As the robot controller 12 is thus constructed, an adequate target position is determined even when the working speed of the robot 10 is changed. For example, when the number of data output from the sensor controller 24 and the number of data output from the robot controller 12 are nearly equal and the working speed of the robot 10 abruptly changes from low to high, information on the work W at desired target point can be missing. But in the above embodiment, because robot control data are generated by interpolating sensed data on scarcer points, such problem will not arise.

When the selected data PS1wall(KH1) is output from the compare block $410_{13}3$, a difference R ofs(KH1) between PS1wall(KH1) and the target data PTpath(KH1) calculated at the interpolation block 402 is calculated as $$R\_ofs(KH1) = (PTpath(KH1))^{-1} \cdot PS1wall(KH1) \quad (15).$$

At a selection block $410_{13}4$, a matrix $\Delta PT(KH1)$ having non-zero components only on such cells corresponding to those sensed by the the sensor 22 is calculated. For example, (1) when only the z component distance (by the tool coordinate system) is sensed, $$\Delta PT(KH1) = \begin{bmatrix} 1 & 0 & 0 & 0 \\ 0 & 1 & 0 & 0 \\ 0 & 0 & 1 & Z \\ 0 & 0 & 0 & 1 \end{bmatrix}. \quad (16)$$

(2) when only the y component distance (by the tool coordinate system) is sensed, $$\Delta PT(KH1) = \begin{bmatrix} 1 & 0 & 0 & 0 \\ 0 & 1 & 0 & Y \\ 0 & 0 & 1 & 0 \\ 0 & 0 & 0 & 1 \end{bmatrix}. \quad (17)$$

(3) when the z component distance and the posture is sensed, $$\Delta PT(KH1) = \begin{bmatrix} & & & 0 \\ R\_ofs(KH1) & & & 0 \\ & & & Z \\ 0 & 0 & 0 & 1 \end{bmatrix}, \quad (18)$$

where $R_{13}$ ofs(KH1) = $(PTpath(KH1))^{-1} \cdot PS1wall(KH1)$. The correction $\Delta PT(KH1)$ thus obtained is input into an abnormality detection block 405 where it is compared with a predetermined threshold value $\beta$. When the amount of $\Delta PT(KH1)$, i.e. $||\Delta PT(KH1)||$, is greater than $\beta$, an adequate abnormality processings, e.g. an emergency stop of the robot operations, are executed because it is possible that the robot 10 is astray. If $||\Delta PT(KH1)||$ is smaller than $\beta$, $\Delta PT(KH1)$ is used to turn out the modified data PTmod(KH1) as described before.

Figure 10:
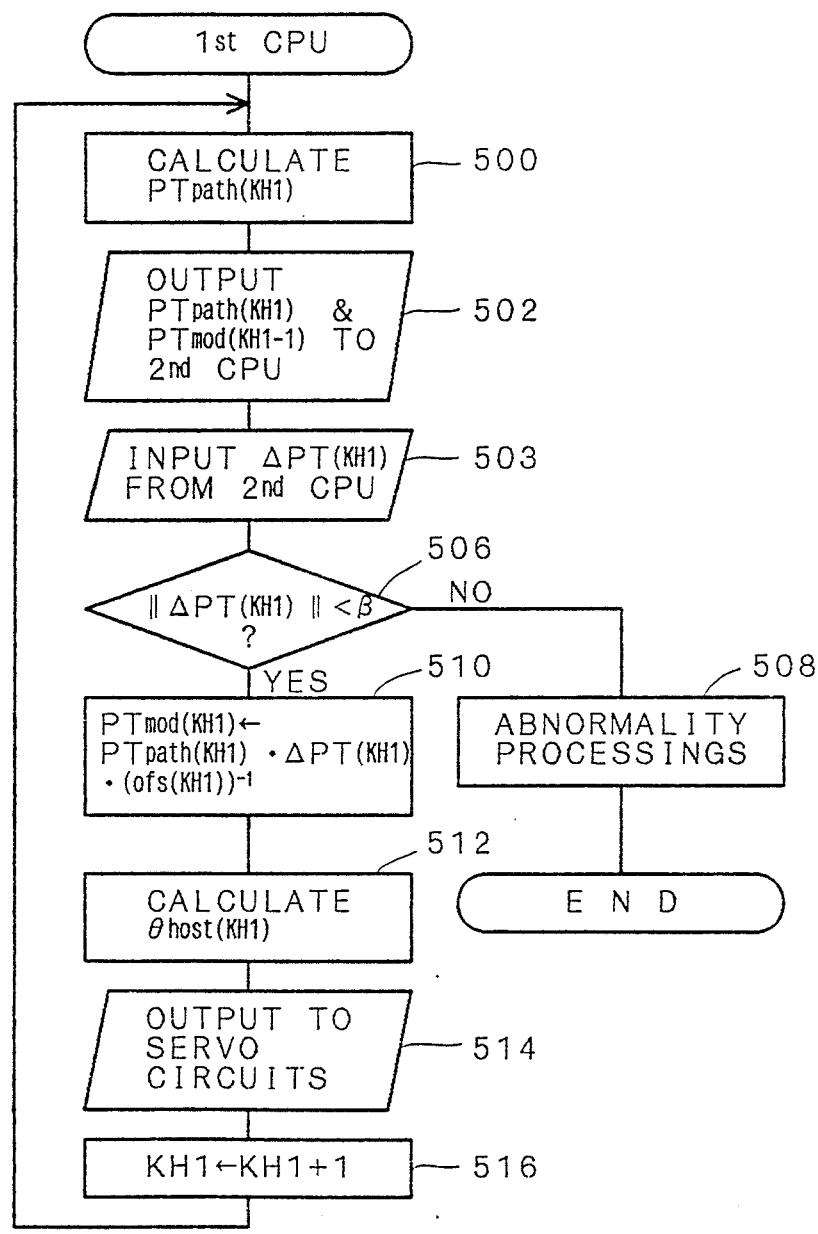
FIG. 10 is a flow chart of a program executed in the first CPU 300 of FIGS. 6 and 7.
Figure 11A:
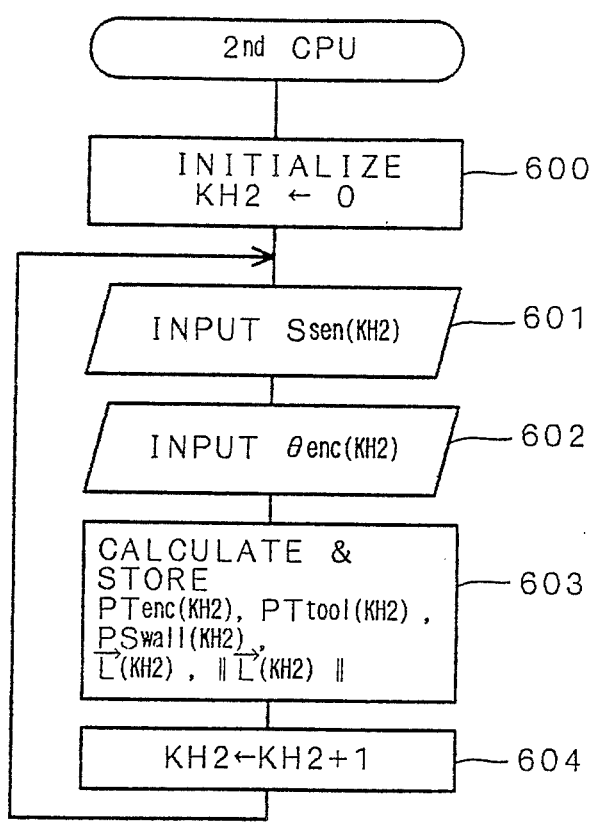

The above processings executed in the first CPU 300 and the second CPU 301 are depicted in the flow charts of FIGS. 10, 11A and 11B. As described before, the first CPU 300 and the second CPU 301 are co-operating in synchronism with each other. In the first CPU 300 as shown in FIG. 10, the following processings are executed after the robot 10 starts a particular job.

step 500: Target position and posture data PTpath(KH1) is calculated from teaching data PTtch(KH0) stored in the memory by known interpolation method.

step 502: The target data PTpath(KH1) of the present point and a modified data of one point before PTmod(KH1−1) are sent to the second CPU 301 to request the correction $\Delta PT(KH1)$.

step 504: The correction $\Delta PT(KH1)$ is input from the second CPU 301.

step 506: The correction $\Delta PT(KH1)$ is compared with the predetermined threshold value $\beta$.

If $||\Delta PT(KH1)|| \geq \beta$, processing steps 510 and after are executed, but if $||\Delta PT(KH1)|| < \beta$, the program goes to step 508.

step 508: An abnormality processing is executed. Specifically, the robot 10 is emergently stopped and the processings are terminated.

step 510: Modified data PTmod(KH1) is calculated from PTpath(KH1), $\Delta PT(KH1)$ and the target offset Ofs(KH1).

step 512: The modified data PTmod(KH1) is decoded into six target rotation angles $\theta$ host(KH1) of the respective axes of the robot.

step 514: The target rotation angles $\theta$ host(KH1) are output to respective servo circuits 320 through 330.

step 516: The counter KH1 is incremented by 1 to repeat the above processing with the new point.

The second CPU 301 executes the program of FIG. 11A and the program of FIG. 11B in parallel by the known multi-task processing. In the first program of FIG. 11A, the following processing steps are executed.

step 600: Counter KH2 for the sensing timing is cleared 0.

step 601: Position and shape data Ssen(KH2) of the sensing point is input from the sensor controller 24.

step 602: Rotation angles $\theta$ enc(KH2) of the six axes are input from the angle sensors 34, 44, 54, 64, 74 and 84. The sensed result should be input just after the sensor 22 starts sensing.

step 603: Actual data PTenc(KH2) on the work point, actual data PTtool(KH2) on the tool tip, the data on the sensing point PSwall(KH2), the vector L(KH2), and the length $||L(KH2)||$ are calculated as described before and stored in the temporary memory $410_{13}$ 2.

step 604: The counter KH2 is incremented by 1 to repeat the above described sensing processings.

The following steps 606 through 623 are executed in parallel with the steps 600 through 604 by the multi-task processing.

step 606: A compare counter i is cleared 0.

step 607: The present target data PTpath(KH1) and the previous modified data PTmod(KH1−1) are input from the first CPU 300.

step 608: PTtool(i) is read out from the temporary memory 410_2 and calculates the vector I(i|KH1) which is spanning from PTtool(i) to PTmod(KH1−1) and the length $||I(i|KH1)||$.

step 609: L(i) is read out from the workpiece shape memory and the angle $\cos\theta(i|KH1)$ between the vectors I(i|KH1) and L(i) is calculated as described above.

step 610: The vector IL(i|KH1), which is a projection of the vector I(i|KH1) on the vector L(i), and the length $||IL(i|KH1)||$ are calculated by the equation (13).

step 611: The change $\Delta IL(i|KH1)$ and the length $||\Delta IL(i|KH1)||$ are calculated by the equation (14).

step 612: It is determined whether $||L(i)||$ is nearly equal to $(||IL(i|KH1)||+||\Delta IL(i|KH1)||)$. When the absolute difference of $||L(i)||$ and $(||IL(i|KH1)||+||\Delta IL(i|KH1)||)$ is smaller than a preset small value $\epsilon$, they are determined as nearly equal. If they are nearly equal, the program proceeds to step 618, otherwise to step 615.

step 615: The compare counter i is compared with the sensing counter KH2. If $i \geq KH2$, the program proceeds to step 622, but if $i < KH2$, to step 616.

step 616: The compare counter i is incremented by 1 to repeat steps 608 and after.

step 618: The data PS1wall(i) is read out from the temporary memory $410_{13}2$ and is put into PS1wall(KH1).

step 619: A difference $R_{13}$ofs(KH1) between the assumed work shape data PS1wall(KH1) and the target data PTpath(KH1) is calculated by the equation (15).

step 620: The correction $\Delta PT(KH1)$ is calculated from the difference $R_{13}$ ofs(KH1) at the selection block $410_{13}4$.

step 622: If $i \geq KH2$, the previous correction $\Delta PT(KH1-1)$ is used as the present correction $\Delta PT(KH1)$.

step 623: The correction $\Delta PT(KH1)$ is sent to the first CPU 300.

step 624: The compare counter i is incremented by 1 to repeat steps 607 and after.

By the above processings, the robot 10 works at every point while sensing the future point on the workpiece. In the above embodiment, the temporary memory $410_{13}2$ seems necessary to have an infinite memory capacity. But a so-called ring-buffer type memory is effective in realizing the temporary memory $410_{13}2$.

The above embodiment has advantages over prior art robot controllers as follows.

(1) The robot 10 is capable of high speed work because it senses the target point in advance. Specifically, a robot according to the present invention has a maximum work speed of up to 500 mm/sec, while conventional robots have maximum work speeds of about 50–100 mm/sec.

(2) The robot 10 cannot go astray because it does not rely solely on the sensed information but it refers also the teaching information.

(3) Accurate control can be performed because the robot 10 is controlled according to a series of target points. For example, even if an abrupt change in the shape of the work exists between the present working point and the present sensing point, the target data of that part is already stored in the memory and an adequate trace on the workpiece can be done.

(4) The temporary memory $410_{13}2$ can admit a change in the working speed. Thus the working speed can be changed during working.

(5) As the sensed information on the position and/or posture is represented by a matrix, the present system can be applied from such a simple system with only one-dimensional correcting function to that with a three-dimensional correcting function.

Obviously numerous modifications and variation of the present invention are possible in the light of the above teachings. It is therefore to be understood that within the cope of the claims, the invention may be practiced otherwise than as specifically described herein.

What is claimed is:

1. A control system for an industrial robot having a hand with a tool and a workpiece shape sensor disposed a predetermined distance in advance of the tool in the direction of travel thereof, a standard course for the tool stored in the system, the sensor being operative to trace the standard stored course, the system comprising:
   means for inputting data corresponding to the shape of workpiece in response to the sensing of the workpiece at one sensing point;
   means for calculating and storing a subsequent position and posture data in a robot coordinate system in accordance with a sensor coordinate system and the position and posture data of the hand in the robot coordinate system for said one sensing point;
   means for calculating a next target standard position and posture data in accordance with the stored standard course;
   means for comparing and selecting the stored subsequent position and posture data most proximate to the next target standard position and posture data;
   means for calculating a difference between the next target standard position and posture data and the selected subsequent position and posture data;
   means for correcting the stored standard position and posture data in accordance with the stored plurality of subsequent position and posture data; and
   control means for controlling the position and posture of the hand in accordance with the calculated difference.

2. A control system according to claim 1 wherein the control means further comprises:
   normally inactive abnormality processing means for indicating an abnormal condition when activated; and
   means for activating the abnormality processing means at times when said difference detected by the comparing means exceeds a predetermined threshold level.

3. A control system according to claim 2 wherein the abnormality processing means further comprises:
   means responsive to the activation thereof for stopping movement of the robot and generating a characteristic signal external of the robot.

4. A control system according to claim 2 wherein the abnormality processing means further comprises means for controlling the position and posture of the robot hand in accordance with the stored standard position and posture data without utilization of the difference detected by the comparing means.

5. A method of controlling an industrial robot having a hand with a tool and a workpiece shape sensor disposed a predetermined distance in advance of the tool in the direction of travel thereof, a standard course for the tool stored in the system, the sensor being operative to trace the standard stored course, the method comprising:
   inputting data corresponding to the shape of a workpiece in response to the sensing of the workpiece at one sensing point;
   calculating and storing a subsequent position and posture data in a robot coordinate system in accordance with a sensor coordinate system and the position and posture data of the hand in the robot coordinate system for said open sensing point;
   calculating a next target standard position and posture data in accordance with the stored standard course;

comparing and selecting the stored subsequent position and posture data most proximate to the next target standard position and posture data;

calculating a difference between the next target standard position and posture data and the selected subsequent position and posture data;

correcting the stored standard position and posture data in accordance with the stored plurality of subsequent position and posture data; and controlling the position and posture of the hand in accordance with the calculated difference.

6. A method according to claim 5 wherein the step of controlling further comprises the substeps of:

activating an abnormality processing means at times when said detected difference exceeds a predetermined threshold level; and indicating an abnormal condition upon activation thereof.

7. A method according to claim 6 wherein the substeps of activating an abnormality process means further comprises:

stopping movement of the robot and generating a characteristic signal external of the robot.

8. A method according to claim 6 wherein the substeps of activating an abnormality processing means further comprises:

controlling the position and posture of the robot hand in accordance with the stored standard position and posture data without utilization of the detected difference.

9. A control system for an industrial robot having a hand with a tool and a workpiece shape sensor disposed a predetermined distance in advance of the tool in the direction of travel thereof, a standard course for the tool stored in the system, the sensor being operative to trace the standard stored course, the system comprising:

means for inputting data corresponding to the shape of a workpiece in response to the sensing of the workpiece at one sensing point;

means for calculating and storing a subsequent position and posture data corresponding to a point in a time at which the tool arrives at said one sensing point;

means for generating output data corresponding to said subsequent position and posture data at the expiration of a time interval corresponding to the time when the tool reaches said one sensing point;

comparing means for detecting the difference between the generated output data and the stored standard course;

control means for controlling the position and posture of the band in accordance with the detected difference including means for generating an abnormality signal when said difference detected by the comparing means exceeds a predetermined threshold level; and means responsive to the abnormality signal for stopping movement of the robot and generating a characteristic signal external of the robot.

10. A control system for an industrial robot having a hand with a tool and a workpiece shape sensor disposed a predetermined distance in advance of the tool in the direction of travel thereof, a standard course for the tool stored in the system, the sensor being operative to trace the standard stored course, the system comprising:

means for inputting data corresponding to the shape of workpiece in response to the sensing of the workpiece at one sensing point;

means for calculating and storing a subsequent position and posture data corresponding to a point in time at which the tool arrives at said one sensing point;

means for generating output data corresponding to said subsequent position and posture data at the expiration of a time interval corresponding to the time when the tool reaches said one sensing point;

comparing means for detecting the difference between the generated output data and the stored standard course;

control means for controlling the position and posture if the hand in accordance with the detected difference including means for generating an abnormality signal when said difference detected by the comparing means exceeds a predetermined threshold level; and means for controlling the position and posture of the robot hand in accordance with the stored standard position and posture data without utilization of the difference detected by the comparing means.

11. A method of controlling an industrial robot having a hand with a tool and a workpiece shape sensor disposed a predetermined distance in advance of the tool in the direction of travel thereof, a standard course for the tool stored in the system, the sensor being operative to trace the standard course, the method comprising:

inputting data corresponding to the shape of a workpiece in response to the sensing of the workpiece at a first sensing point;

calculating and storing a subsequent position and posture data corresponding to a point in time at which the tool arrives at said first sensing point;

generating output data corresponding to said subsequent position and posture data at the expiration of a time interval corresponding to the time when the tool reaches the first sensing point;

detecting the difference between the generated output data and the stored standard course;

controlling the position and posture of the hand in accordance with the detected difference;

activating an abnormality processing means at times when said detected difference exceeds a predetermined threshold indicating an abnormal condition external of the robot upon activation thereof; and stopping movement of the robot upon activation thereof.

12. A method of controlling an industrial robot having a hand with a tool and a workpiece shape sensor disposed a predetermined distance in advance of the tool in the direction of travel thereof, a standard course for the tool stored in the system, the sensor being operative to trace the standard course, the method comprising:

inputting data corresponding to the shape of a workpiece in response to the sensing of the workpiece at a first sensing point;

calculating and storing a subsequent position and posture data corresponding to a point in time at which the tool arrives at said first sensing point;

generating output data corresponding to said subsequent position and posture data at the expiration of a time interval corresponding to the time when the tool reaches the first sensing point;

detecting the difference between the generated output data and the stored standard course;

controlling the position and posture of the hand in accordance with the detected difference; and controlling the position and posture of the robot hand in accordance with the stored standard position and posture data without utilization of the detected difference.

* * * * *

UNITED STATES PATENT AND TRADEMARK OFFICE
CERTIFICATE OF CORRECTION

PATENT NO. : 4,831,316
DATED : May 16, 1989
INVENTOR(S) : YASUO ISHIGURO ET AL.

It is certified that error appears in the above-identified patent and that said Letters Patent is hereby corrected as shown below: ON TITLE PAGE:

Assignees should read --TOYOTA JIDOSHA KABUSHIKI KAISHA AND KABUSHIKI KAISHA TOYOTA CHUO KENKYUSHO--.

Claim 1, column 14, line 9, after "of" (first occurrence), insert --a--.

Claim 9, column 15, line 40, after "in", delete --a--.

Claim 9, column 15, line 50, change "band" to --hand--.

Claim 10, column 15, line 65, after "of" (first occurrence) insert --a--.

Claim 10, column 16, line 10, change "if" to --of--.

Signed and Sealed this

Eighth Day of September, 1992

Attest:

DOUGLAS B. COMER

*Attesting Officer*  *Acting Commissioner of Patents and Trademarks*